Nov. 19, 1963 R. G. D'ASCOLI 3,111,551
FLUID-COOLED POWER CABLE
Filed May 13, 1960 3 Sheets-Sheet 1
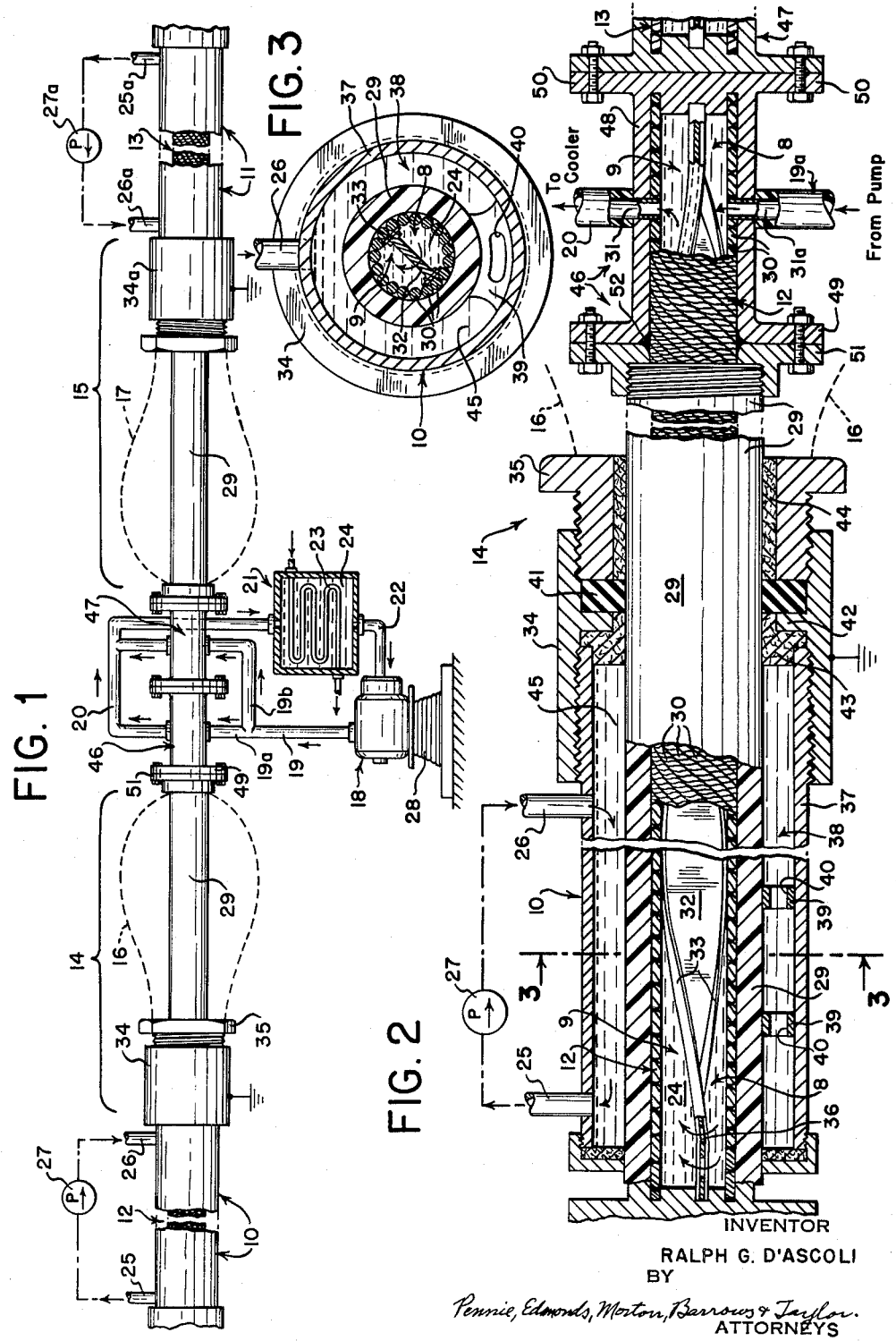
INVENTOR
RALPH G. D'ASCOLI
BY
Pennie, Edmonds, Morton, Barrows & Taylor.
ATTORNEYS Nov. 19, 1963
R. G. D'ASCOLI
3,111,551
FLUID-COOLED POWER CABLE
Filed May 13, 1960
3 Sheets-Sheet 2
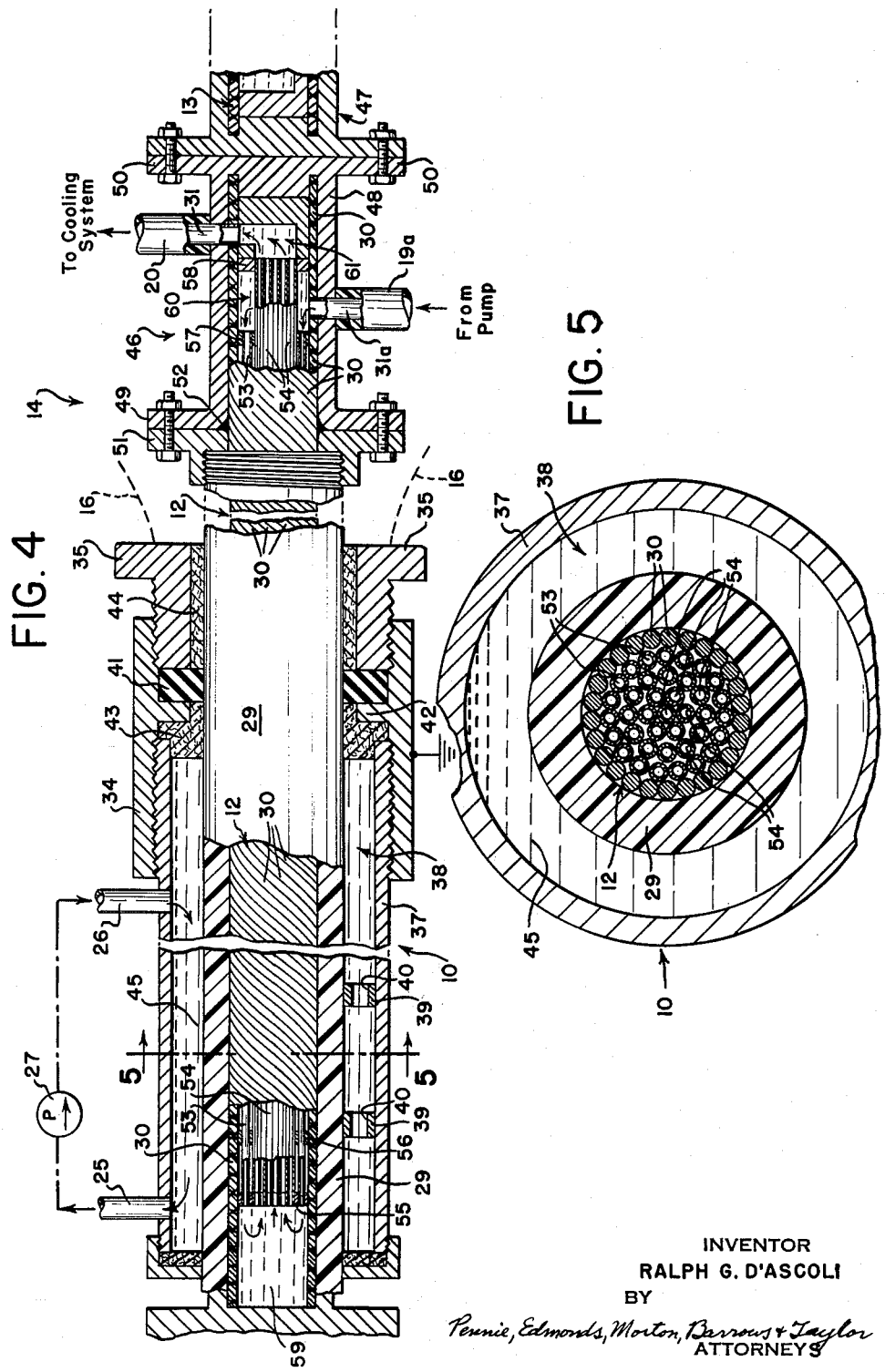
INVENTOR
RALPH G. D'ASCOLI
BY
Pennie, Edmonds, Morton, Barrows & Taylor
ATTORNEYS Nov. 19, 1963     R. G. D'ASCOLI     3,111,551
FLUID-COOLED POWER CABLE
Filed May 13, 1960     3 Sheets-Sheet 3
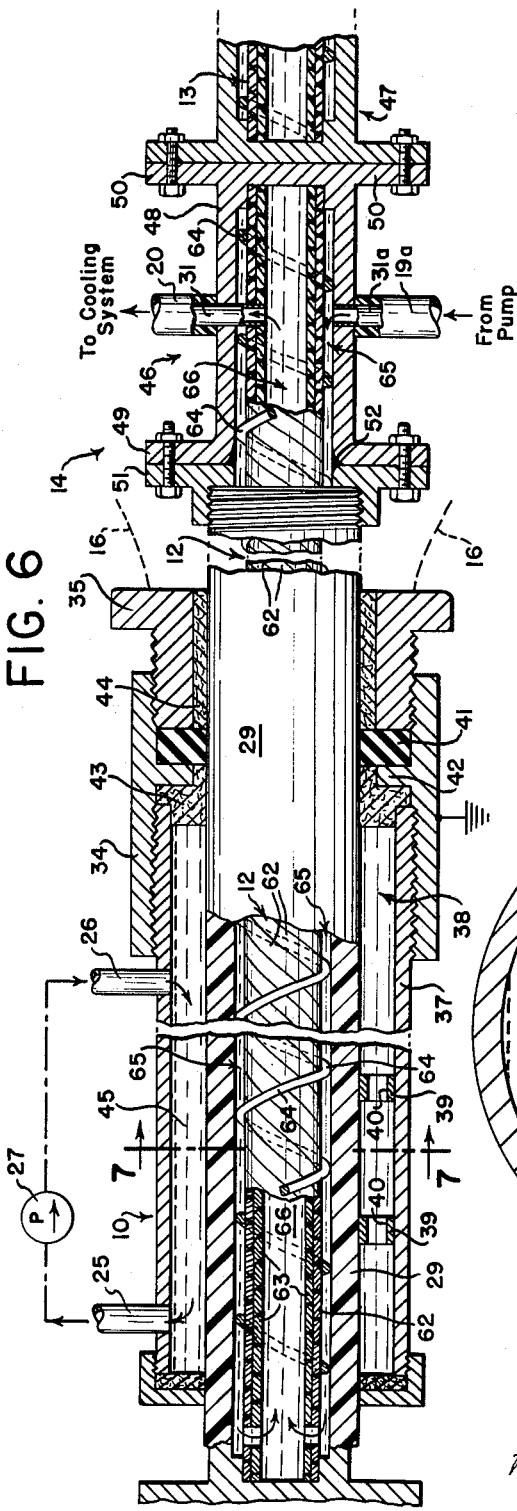
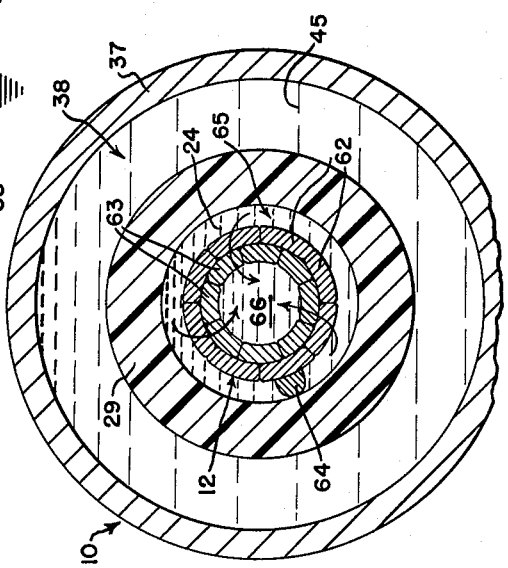
INVENTOR
RALPH G. D'ASCOLI
BY
Pennie, Edmonds, Morton, Barrows & Taylor
ATTORNEYS United States Patent Office 3,111,551
Patented Nov. 19, 1963

3,111,551
FLUID-COOLED POWER CABLE
Ralph Gregory D'Ascoli, Yonkers, N.Y., assignor to Anaconda Wire and Cable Company, a corporation of Delaware
Filed May 13, 1960, Ser. No. 28,995
22 Claims. (Cl. 174—15)

This invention relates to electric power transmission, and especially to power cables and cable systems for heavy currents at moderately high voltages.

The purpose of the invention is to improve the efficiency and reliability of such cables and systems, as well as to increase their useful life and to reduce the cost of manufacture.

Characteristic of the invention is an electric conductor which incorporates one or more fluid-carrying conduits and means for circulating a semi-conductive cooling fluid therein. As the primary insulation, a single thick-walled extruded layer of plastic material is employed to surround the conductor, the arrangement being such that the fluid is in intimate contact with the conductor as well as with the inside surface of the insulation.

Plastic materials such as polyethylene, polyvinylchloride, natural and synthetic rubbers, etc., are known to be suitable as electrical insulation in cables, but heretofore have been employed as a single layer primarily only on small wires and for low voltages, because of the difficulty of extruding or otherwise applying such material about the conductor in an insulating layer sufficiently thick and otherwise satisfactory for power transmission, especially at high voltages. Hence, the primary insulation in cables for high voltages has been formed of several layers applied by successive passes of the cable through extrusion machines, or of other types of multiple layer construction. These expensive methods have been necessary because, when plastic material is extruded in a layer more than approximately ⅜ inch thick, the inclusion of flaws, viz., small air-filled voids in the material, has been found to be substantially unavoidable. Such voids frequently occur at or near the surfaces of the extruded material and, even though they be of very small size, will create a focal point of ionization due to the concentration of an electric field at such point. As a result, the insulation will deteriorate at the locations of the voids, and in time will spread, decreasing the insulation resistance until breakdown occurs. Identical difficulties have been experienced with cables insulated by paper tape as well as by oil-impregnated paper tape, but the oil impregnation tends to extend the life of the cable somewhat. Thus the cable construction most generally employed for high power cables at moderate and high voltages has been of the oil-impregnated paper type. When such cable is used for transmission at higher voltages the tendency to breakdown is greater; and to reduce this tendency it has been customary to maintain the insulating oil, or dry gas, within the cable sheath under pressure.

The improvements introduced by the present invention not only permit the use of a solid, monolithic layer of plastic, such as polyethylene as the primary insulation, but also appreciably increase the useful life of the cable, notwithstanding the additional advantage that the new cable is capable of carrying heavier current than previous cables having similar conductor cross-section. These improvements are due to the fact that, in accordance with the invention, a semi-conductive fluid is maintained in continuous electrical and thermal contact with the current-carrying conductor as well as the inside surface of the primary insulation. By circulating and cooling this fluid the current-carrying capacity of the cable and also its useful life are increased. Additionally, in accordance with the invention, a second fluid which may have characteristics different from those of the first fluid, and which may or may not be semi-conductive, is introduced between the exterior of the primary insulation and the metallic jacket or the equivalent. If this latter fluid is also circulated and cooled, the life and current-carrying capacity of the cable may be still further increased. If the second-mentioned fluid is also of the semi-conductive type, the external semi-conductive layer customarily employed to reduce corona effects, may be omitted. By merely increasing the pressure of either or both of the fluids, the cable may be operated at higher voltage.

A more complete understanding of the invention and of its many advantages will be had from consideration of the following description together with the accompanying drawings in which:

FIG. 1 is a general representation of part of a high-voltage transmission system, including two different types of fluid circulating systems, according to the invention;

FIG. 2 is a detail view in longitudinal cross-section of a cable and cable termination including a coupling to a contiguous cable length, which illustrates one embodiment of the invention;

FIG. 3 is a cross-sectional view of the cable of FIG. 2 taken along the line 3—3 of FIG. 2;

FIG. 4 is a detail view in cross-section of a second embodiment of the invention;

FIG. 5 is a cross-sectional view of the cable of FIG. 4 taken along the line 5—5 of FIG. 4;

FIG. 6 is a detail view in cross-section of a third embodiment of the invention; and FIG. 7 is a cross-sectional view of the cable of FIG. 6 taken along the line 7—7 of FIG. 6.

A diagrammatic representation of a system in accordance with the invention is illustrated in FIG. 1. Here, two lengths of cable, 10 and 11 are represented. These may be of any of the forms hereinafter described in detail. Each of these cables is broken away to show the central conductor 12 and 13, respectively. In an actual installation, each cable length 10 and 11 might be 100 or more feet long. These two cable lengths terminate, respectively, in terminations 14 and 15, the construction of which is shown in more detail in the subsequent figures. The dotted line enclosures 16 and 17 represent the usual insulating stress cones which are commonly employed at high voltage cable terminations.

Referring to FIG. 1, a suitable semi-conductive cooling fluid (later described) is circulated through both conductors of the two adjacent cable lengths by means of a single circulating system such as that shown at the center of the figure. Although a single circulating system for the two cable lengths is here represented, a separate system for each could, of course, be employed. Here, the cooling system comprises a motor-driven circulating pump 18, the outlet pipe 19 from which feeds inlet branch 19a to termination 14 and inlet branch 19b to termination 15.

After circulating through the conductors of the respective cable lengths and returning through the respective cable lengths to the terminations from which they started, the two fluids combine in return pipe 20. This fluid passes through heat exchanger 21, is hereby cooled, and then returns through intake pipe 22 to pump 18. By circulating a suitable coolant, such as cold water, through the coils 23, the required heat will be extracted from the semi-conductive fluid 24 in passing through the heat exchanger. Insulator 28 represents diagrammatically, the insulation required not only for the pump 18 but for the entire circulating system, because the semi-conductive liquid which is circulated through the conductor will be at a high potential. Although it is usually preferable to circulate the fluid in both directions within the cable, the return flow may be external to the cable in an insulated pipe.

An additional cooling liquid may also be circulated externally of the primary insulation; viz., between, and in contact with, the outside of the insulating layer and the jacket or casing in which the cable is enclosed. This may be semi-conductive fluid, as above mentioned, or merely a cooling fluid. The circulating system includes an outlet 25 and an inlet 26 at the respective ends of the cable length 10, and a pump 27 connected between them. A similar system is also shown for cable length 11, in which the outlet 25a, inlet 26a and pump 27a correspond. This external system would normally be at ground potential, and would not be called upon to dissipate as much heat as would the system which circulates the internal cooling liquid. Hence, in such installations, the inlet 25 and outlet 26 may be interconnected merely by an exposed pipe, or by a pipe line which includes additional radiating surface; or they may be omitted.

A semi-conductive fluid which is suitable for use in the cable of the present invention should have certain characteristics depending in part on the nature of the service in which the cable is used. In general, the fluid should not be detrimental to the other components of the cable or equipment with which it may come in contact; it should not be combustible, or excessively expensive; it should have highest possible specific heat; should remain a liquid and retain its other characteristics between say, $-20°$ C. and $100°$ C. Its useful life should be many years, and it must comprise a true semi-conductor viz., its conductivity must be low. The conductivity limits are not precise, but for cables of the type herein described, the conductivity expressed as resistivity should be between approximately 200 and 2,000 ohms per inch cube.

The required characteristics and qualities are provided by a weakly basic aqueous solution. It is well known that the conductivity of such a solution depends on the ionization constant and the concentration. Potassium, sodium, caesium and lithium hydroxides, or mixtures thereof, are suitable, although potassium hydroxide is presently preferred. An aqueous solution of potassium hydroxide having a pH between 7 and 8 inclusive, is satisfactory. Such a solution may be prepared by dissolving from 6 to 25 milligrams of KOH in a liter of distilled water.

A detail view of one embodiment of the invention is illustrated in FIG. 2 which shows in longitudinal cross section, one end of a cable length with its termination, and a coupling by which a duplicate cable length is attached. Here, the power carrying conductor 12 comprises a layer of solid copper wires 30, spirally laid to form, in effect, a metal tube. The interior of this tube is divided by a liquid-impervious wall 32, preferably of conducting material such as copper, which divides the space, into two conduits. This wall is essentially of I-beam cross-section and the flanges 33 (FIG. 3) make good electrical contact with the conducting wires 30, so as to retain the strip in the desired contacting position, and increase the current capacity of the cable. Semi-conductive fluid 24 is caused to circulate in opposite directions in these conduits, respectively. Obviously, the semi-conductive fluid itself also increases the current capacity of the composite conductor. By twisting the strip comprising wall 32, as shown, the fluid contacts the interior surface of the conductor more uniformly and thus improves the cooling.

The primary insulation for the conductor comprises a thick layer 29 of insulating material which, as above mentioned, is of plastic such as polyethylene and which possesses many desirable characteristics for insulation in high voltage cables. The insulation should be non-permeable to the fluid. In cables to be used for moderately high voltages, a single layer of polyethylene, or the like, may comprise the only primary insulation; and this may have a thickness in excess of ⅛ inch.

As is seen more clearly from the transverse cross-section illustrated in FIG. 3, the spaces between the individual conductor wires 30 under insulation layer 29 permit the semi-conductive fluid 24 to be in substantially continuous contact with the interior surface of the insulation. At the right-hand end of FIG. 2, inlet and outlet pipes 19a and 20 respectively, are shown in more detail than in FIG. 1. They comprise preferably, tubing of insulating material such as polyethylene attached to the cable by metal nipples 31. Since, in this embodiment, the fluid flows through the interior of the conductor in both directions, it is necessary that the two conduits be interconnected at one end of each cable length. This provision is shown in FIG. 2 as comprising one or more holes 36 through the wall 32.

Surrounding the insulated conductor is a metallic sheath 37 which advantageously comprises an iron pipe. The inside diameter of this pipe is larger than the exterior diameter of the insulating layer 29 and thus forms a space 38 therebetween. This space is maintained by suitable spacers 39, concave on top and convex on the bottom. In FIG. 2, these spacers are shown only on the bottom because it is here assumed that the cable is maintained in horizontal position. The spacing need not be uniform, viz. it often is greater at the top. If required, the spacers can be circular so as to surround the insulating layer 29. Here, they are shown to include apertures 40 to permit the flow of liquid therethrough. Alternately, half-round "skid wire," ¼ inch, or so, wide can be helically wrapped around the insulation to form the space 38. Such skid wire is illustrated in FIG. 6.

Since terminations 14 and 15 (FIG. 1) are alike, only the first will be described. Termination 14 is shown in detail in FIG. 2. Here, a threaded coupling sleeve 34 is shown to be attached to the threaded end of metallic sheath 37. A gland 35 screws into the opposite end of the sleeve 34 against a sealing gasket 41 which sits against a shoulder 42 within the sleeve 34. Suitably shaped packing 43 and 44 disposed between the surface of the insulation 29 and the sleeve 34 and gland 35, respectively, provides a liquid-tight seal with respect to the outer fluid 45.

Beyond the termination 14 are two coupling sections 46 and 47 (FIG. 1) which include provisions for circulating and cooling the inner fluid 24. Since these sections are fundamentally similar, only section 46 is illustrated in detail in FIG. 2.

Coupling section 46 need be only long enough to incorporate the elements and construction as illustrated. It comprises an outer sheath 48, of hard copper for example, formed with integral flanges 49, 50 at either end. Flange 49 is bolted to a terminal flange member 51 of similar material, which makes a tight fit to the outside of the insulating layer 29, as by threading. It is desirable that the terminal flange member 51 be electrically and mechanically secured to the conductors 30 by hard solder 52, or the like. Flange 50 on the right-hand end of coupling section 46 is bolted, as shown, to the matching flange of a similar coupling section 47. This connection joint carries the full current from one section to the next.

As seen in FIG. 2, coupling section 46 is provided with nipples 31, 31a, previously mentioned, to which are attached the connecting pipes 20 and 19a respectively. These nipples pass through the coupling section and also through the conductors 30 so as to communicate with the two fluid conduits 8 and 9 formed by the dividing wall 32. To clarify the drawing these nipples are shown in the central portion of the coupling section 46, but actually they should be close to the flange 50 in order to assure fluid circulation at the extreme end of the section.

The embodiment ilustrated in FIGS. 4 and 5 is similar in many respects to that above described in connection with FIGS. 2 and 3. Hence, similar reference characters have been applied to corresponding component parts which will not be described again in detail. The principal differences between the two embodiments are in the construction of the conductor and the construction and arrangement of the fluid-conducting conduits. Instead of being formed by only a single layer of solid copper conductors laid in the form of a cylinder as in FIGS. 2 and 3, the power-carrying conductor here comprises, in addition, a number of hollow copper conductor tubes laid in the space within the cylinder. Such a conductor will obviously have greater current carrying capacity than the hollow cylindrical conductor of FIG. 3.

As is clearly seen in FIG. 5, a large number of copper conductor tubes substantially fill the inside of the cylinder formed by the solid copper conductors 30. Such a structure permits the flow of semi-conductive fluid in any of several alternative paths, the selection and location of which will depend upon the requirements. As an alternative, the conductors 30 may themselves be hollow so as to carry semiconductive fluid. By properly terminating certain of the tubular conductors into a common manifold they can be connected to carry fluid in one direction, and the remainder to carry fluid in the opposite direction. Furthermore, the interstices between the conductor tubes can advantageously be employed as all or part of a fluid conduit.

In the embodiment illustrated in FIGS. 4 and 5, the outermost layer of conductor tubes 53 comprises part of a fluid channel with which pipe 19a, from the pump, communicates. The return flow, which is indicated by the arrows at the left-hand end of FIG. 4, is carried through all of the tubes 54 included within the outer layer of tubes 53. The required separation of these two fluid paths at the left-hand end of the figure is achieved by the headers 55 and 56, which are preferably of copper. Selected groups of the tubes terminate in holes through these headers. Other holes (not shown) in the headers between the conductors permit the passage of fluid through the mentioned interstices, or spaces, between the conductors. Since such fluid passes along the outside of the tubes, it also flows in the interstices between the conductors 30 and the insulation layer 45, and this flows in contact with the inner surface of the insulation.

The separation of the two fluid channels at the right-hand end of the cable section illustrated in FIG. 4 is achieved by headers 57 and 58. At the right of FIG. 4 it will be seen that the liquid flows from the pump through inlet manifold 60, and thence into the tubes which open through header 57. Similarly, the tubes which conduct the fluid in the return channel through header 58, communicate with outlet manifold 61 and thence through pipe 20 to the cooling system.

A third embodiment of the invention is illustrated in FIGS. 6 and 7, where components corresponding to those of the preceding figures have been given the same reference characters. Here again the principal differences in this embodiment relate to the form of the power carrying conductor and to the conduits in which the semi-conductive fluid circulates.

In this embodiment the conductor is shown to comprise two layers of copper conductors 62 and 63 of approximately rectangular cross-section, spirally laid and pressed together to form concentric cylindrical layers. One layer or more than two layers may of course be employed. The result comprises in effect, a somewhat flexible cylindrical copper conductor having a wall thickness sufficient to carry the required current.

The cylindrical power conductor is spaced from the primary insulating layer 29 by a skid wire 64, which customarily is semi-circular in cross-section, although not necessarily so. This skid wire is spirally wrapped around the conductor with a pitch as shown in FIG. 6, so as to retain the conductor concentric with the inside surface of the insulation 29, forming a fluid conduit 65 therebetween. The semi-conductive fluid passes into this fluid conduit 65 through inlet pipe 19a as seen in FIG. 6. Thus the incoming fluid is maintained in electrical and heat conducting contact with the inner surface of the insulation and with the outer surface of the power conductor. This large conduit permits more rapid flushing of the surfaces of the conductor and the insulation, with consequent advantages.

When the fluid in channel 65 (FIG. 6) reaches the end of the cable section it flows into manifold 59 and returns through the inner fluid channel 66, whence it passes out at the opposite end of the cable length through pipe 20 to the cooling system. As in the case of FIG. 4, the pipes 19a and 20 should be closer to the right-hand end of the cable section than shown in the drawing.

Many additional variations and modifications of the forms of construction above described will occur to those skilled in the art, all being within the scope of the invention as defined in the appended claims.

I claim:

1. In an electric power transmission system a length of high voltage power cable including a central conductor, a layer of solid plastic material surrounding the conductor and comprising the primary insulation therefor, said conductor having first and second fluid conduits, at least one of which is bounded by the inner surface of said plastic layer and by a surface of the conductor, a sheath of heat-conducting material spaced from the outer surface of said layer to form a fluid conducting channel therebetween, first termination means disposed at one end of said cable length and including means for interconnecting said first and second conduits, second termination means including means separating said first and second conduits disposed at the other end of said cable length, fluid couplings opening respectively into said first and second conduits at said second termination means, a semi-conductive cooling fluid in said conduits, means for circulating said fluid in electrical and thermal contact with said conductor and with the inner surface of said insulating layer, and a cooling fluid in said channel in thermal contact with the outer surface of said insulating layer and with the inner surface of said sheath, and means for maintaining said fluids separated from each other.

2. A system according to claim 1 in which the means for circulating said semi-conductive fluid includes a pump, means for cooling said fluid, and means insulating said pump and fluid-cooling means with respect to ground.

3. A system according to claim 1 in which said conductor comprises a hollow tubular structure formed of a plurality of segmental contiguous copper elements.

4. A system according to claim 1 in which said central conductor comprises a plurality of longitudinal copper elements electrically connected in parallel with each other and of external shape such as to form a plurality of longitudinal fluid channels therebetween.

5. A system according to claim 1 in which said conductor includes a plurality of copper tubes, spacer means retaining said tubes in fixed relation, and a manifold into which some of said tubes terminate such that one of said conduits comprises the fluid capacity of some of said tubes.

6. A system according to claim 1 in which said conductor includes a plurality of conductor tubes, spacer means retaining said tubes spaced apart in fixed relation, and a manifold into which some of said tubes terminate, said spacer means and said manifold being so formed and disposed with respect to said tubes and said insulation layer that one of said conduits comprises the aggregate of some of said tubes, and another of said channels comprises the aggregate of others of said tubes, the interstices between certain of said tubes and the space between the inner surface of said insulation and the outer surface of said central conductor.

7. In an electric power transmission system, two lengths of similar power cable, each including a central conductor having a plurality of longitudinal fluid conduits, at least two of said conduits being adapted to carry fluid in opposite directions, a layer of solid plastic insulation disposed over the conductor to comprise the primary insulation therefor, at least one of said conduits including an inner surface of said insulation, a sheath surrounding said insulating layer and spaced therefrom to form a fluid-conducting channel therebetween, a cable termination at the extreme end of each cable length including means interconnecting the conduits therein so as to reverse the direction of fluid flow, cable termination and splicing means joining the contiguous ends of said cable lengths such that the ends of the conductors are conductively connected together and the conduits and channels are terminated, first inlet and outlet fluid couplings opening respectively into the conduits of both cable lengths, second inlet and outlet fluid couplings opening respectively into the channels of both cable lengths, first circulating means for circulating a first semi-conductive cooling fluid through the conduits of both cable lengths, and additional circulating means for circulating semi-conductive cooling fluid through the channels of both cable lengths, said circulating means including said couplings, pumping means, means for cooling said fluids, and fluid connections between the same, and means insulating said first and additional circulating means with respect to each other.

8. A system according to claim 7, characterized in that said conduits, channels and circulating means are substantially filled with fluids comprising weakly basic aqueous solutions, and said conduits and channels are so disposed with respect to said insulation layers that one fluid is in substantially continuous contact with the inside surfaces of both insulating layers and the other fluid is in substantially continuous contact with the outside surfaces of both said layers.

9. In an electric power transmission system, a length of high voltage power cable including a conductor, a layer of solid plastic material surrounding the conductor and comprising the primary insulation therefor, said conductor having at least one fluid conduit, said conduit being bounded by the inner surface of said plastic layer and by a surface of the conductor, termination means disposed at both ends of said cable length into which said conduit terminates, fluid couplings communicating with said conduit through both of said terminations, a semi-conductive cooling fluid in said conduit in electrical contact with said conductor and the inner surface of said plastic layer substantially throughout the length thereof and fully insulated from ground, and means including said couplings for circulating said fluid in electrical and thermal contact with said conductor and with the inner surface of said insulating layer.

10. In a system according to claim 9, a sheath of heat-conducting material spaced from the outer surface of said layer to form a fluid conducting channel therebetween, a cooling fluid in said channel in thermal contact with the outer surface of said insulating layer and with the inner surface of said sheath, and means for maintaining said fluids separated from each other.

11. In an electric power transmission system, a length of high voltage power cable including a conductor, a layer of solid plastic material surrounding the conductor and comprising the primary insulation therefor, a metallic sheath spaced from the outer surface of said layer to form a fluid conducting channel therebetween, a termination at each end of said cable length including fluid sealing means interposed between the sheath and the outer surface of said plastic layer, and a semi-conductive cooling fluid in said channel comprising a weakly basic aqueous solution in electrical and thermal contact with the outer surface of said layer and the inner surface of said sheath substantially throughout the length thereof and fully insulated electrically from ground.

12. A length of high voltage electric power cable including a conductor and a layer of insulation surrounding the conductor, said cable having a plurality of longitudinal fluid conduits comprising a part thereof, said conduits being disposed to form at least two channels disposed and arranged, respectively, to conduct fluid in opposite directions and to maintain said fluid in contact with the inside surface of said insulation and with a substantial part of a surface of said conductor, semi-conducting fluid substantially filling said conduits, said fluid being in electrical contact with said conductor and the inside surface of said insulation substantially throughout the length thereof and fully insulated electrically from ground, channel interconnecting means at one end of said cable length adapted to conduct fluid from one channel into the other so as to reverse the direction of flow, and external fluid couplings at the other end of said cable length opening into said channels, respectively.

13. An electric power transmission system which includes a length of high voltage power cable in accordance with claim 12, and pumping means connected to said couplings for circulating said fluid.

14. In a system according to claim 13, a metallic sheath surrounding said cable length and spaced from said layer of insulation to form a channel therebetween, a second semi-conductive cooling fluid in said channel, and means including said insulation for electrically insulating said fluids with respect to each other.

15. A system according to claim 14 which includes a metal circulation pipe external to said cable length, coupled into said channel at both ends of said cable length and electrically connected to said sheath.

16. In a system according to claim 15, circulating means for circulating said second fluid through said channel and pipe, said circulating means being electrically grounded.

17. A system according to claim 16 in which at least one of said semi-conductive fluids comprises a weakly basic aqueous solution.

18. A system according to claim 17 in which said semi-conductive fluid comprises an aqueous solution of potassium hydroxide having a pH between 7 and 8 inclusive.

19. A system according to claim 12 in which said conduits are substantially filled with a semi-conductive fluid comprising a weakly basic aqueous solution.

20. In an electric power transmission system, a length of high voltage power cable including central conductor means having at least one integral longitudinal fluid conduit therein for conducting a fluid in one direction, at least one additional longitudinal fluid conduit within the cable for conducting said fluid in the opposite direction, a layer of solid plastic material surrounding said conductor and both of said conduits to provide the primary insulation for the conductor, the inside surface of said insulation being in contact with said fluid, first conduit termination means including means interconnecting said conduits at one end of a cable length, second conduit termination means disposed at the other end of said cable length, fluid couplings opening respectively into said conduits at said second termination means, means including said couplings adapted to circulate an aqueous fluid through said conduits in substantially continuous electrical and thermal contact with said conductor and with the inner surface of said insulation, and a weakly basic aqueous solution substantially filling said conduits and said circulating means.

21. In a high-voltage power cable including a conductor surrounded by a layer of solid insulating material comprising the primary insulation of the cable, means for preventing deterioration of said layer due to localized voltage stresses on the inside surface of said layer with elevated temperature, comprising conduit means including the inside surface of said layer and a surface of said conductor, a fluid within said conduit means in electrical contact with said conductor and the inside surface of said layer substantially throughout the length thereof and fully insulated electrically from ground, said fluid having high thermal conductivity and being electrically semi-conductive, and means for circulating said fluid.

22. A high-voltage power cable according to claim 21 in which said fluid comprises a weakly basic aqueous solution of an hydroxide selected from the group: potassium, sodium, caesium and lithium hydroxides.

References Cited in the file of this patent

UNITED STATES PATENTS

| | | |
|---|---|---|
| Re. 17,156 | Bassett | Dec. 11, 1928 |
| 2,145,182 | Kirch | Jan. 24, 1939 |
| 2,222,574 | Robertson | Nov. 19, 1940 |
| 2,433,588 | Wreford | Dec. 30, 1947 |
| 2,535,187 | Anderson et al. | Dec. 26, 1950 |
| 2,894,054 | Cameron et al. | July 7, 1959 |
| 2,946,837 | Beamish | July 26, 1960 |

FOREIGN PATENTS

| | | |
|---|---|---|
| 617,699 | Great Britain | Feb. 10, 1949 |